(12) United States Patent
Yu et al.

(10) Patent No.: US 7,029,788 B2
(45) Date of Patent: Apr. 18, 2006

(54) 9V RECHARGEABLE BATTERY

(75) Inventors: Jianbo Yu, Guangdong-Province (CN); Ping Zhang, Guangdong-Province (CN); Jiangfeng Wu, Guangdong-Province (CN); Xuefeng Gao, Guangdong-Province (CN)

(73) Assignee: Shenzhen Likexing Battery Co., Ltd., Shenzhen (CN)

( * ) Notice: Subject to any disclaimer, the term of this patent is extended or adjusted under 35 U.S.C. 154(b) by 556 days.

(21) Appl. No.: 10/226,226

(22) Filed: Aug. 23, 2002

(65) Prior Publication Data

US 2003/0054238 A1    Mar. 20, 2003

(30) Foreign Application Priority Data

Aug. 24, 2001  (CN) .............................. 01234377 U

(51) Int. Cl.
*H01M 2/02*    (2006.01)
*H01M 2/10*    (2006.01)

(52) U.S. Cl. .......................... 429/159; 429/99; 429/176

(58) Field of Classification Search .................. 429/99, 429/100, 156, 159, 176
See application file for complete search history.

(56) References Cited

U.S. PATENT DOCUMENTS 3,661,649 A * 5/1972 Kaye ........................... 429/163
6,376,122 B1 * 4/2002 Cheeseman .................. 429/99

* cited by examiner

*Primary Examiner*—Jonathan Crepeau
(74) *Attorney, Agent, or Firm*—McDermott Will & Emery LLP

(57) ABSTRACT

A 9V rechargeable battery comprising a plurality of column cells connected in series and enclosed by a container and a cover with a negative terminal and a positive terminal. Said container (1) further comprises a pair of lateral sidewalls formed with openings and another pair of lateral sidewalls formed with recesses so as to receive said cells snugly.

6 Claims, 2 Drawing Sheets

9V RECHARGEABLE BATTERY

FIELD OF THE INVENTION

The present invention relates to a 9V rechargeable battery, and more particularly, to a 9V rechargeable battery interchangeable with a conventional laminated 6F22-type battery.

DESCRIPTION OF THE PRIOR ART

A conventional 9V laminated (6F22) battery is a typical dry battery. Recently, in consideration of resource recycling and economic reasons, 9V rechargeable batteries that are interchangeable in shape with 9V laminated (6F22) batteries have been substantially developed. A conventional 9V rechargeable battery typically consists of 6 or 7 button nickel cadmium (Ni—Cd) cells or nickel metal hydride (Ni—MH) cells sealed in a plastic or metallic container. A single button cell has a relatively low capacity, and the container takes up considerable room. Therefore, a conventional 9V rechargeable battery has a relatively low capacity (100–160 mAh), and also disadvantageously takes about 15 hours to fully charge the battery.

SUMMARY OF THE INVENTION

It is an object of the present invention to provide a fast-rechargeable 9V battery having higher capacity.

Therefore, the present invention provides a 9V rechargeable battery comprising: a plurality of column cells connected in series and enclosed by a container and a top cover with a positive terminal and a negative terminal.

Compared with the prior art, a battery according to the present invention comprises a plurality of cells with a larger diameter, and the capacity thereof is therefore increased without any substantial change in shape or size.

DETAILED DESCRIPTION OF THE PREFERRED EMBODIMENT

This invention will be described in detail with reference to the accompanying drawings.

The entire disclosure of Chinese Patent Application No. 01234377.3, filed Aug. 24, 2001, is hereby incorporated by reference.

Figure 2:
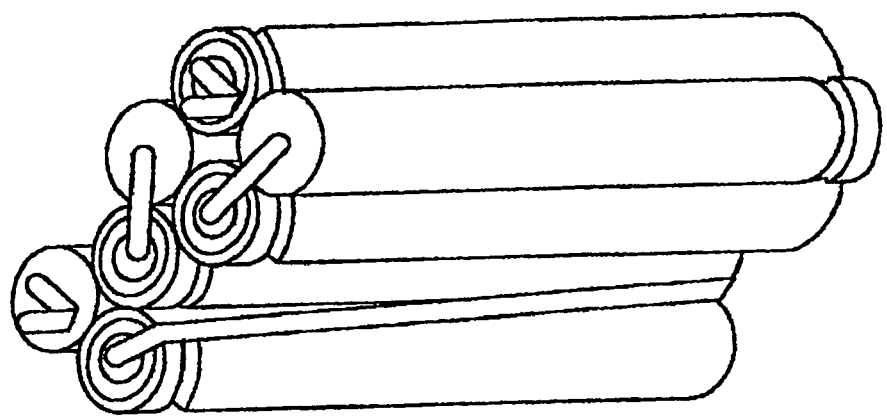
FIG. 2 is a schematic view of a battery comprising 7 column cells connected in series according to another embodiment of the present invention.
Figure 1:
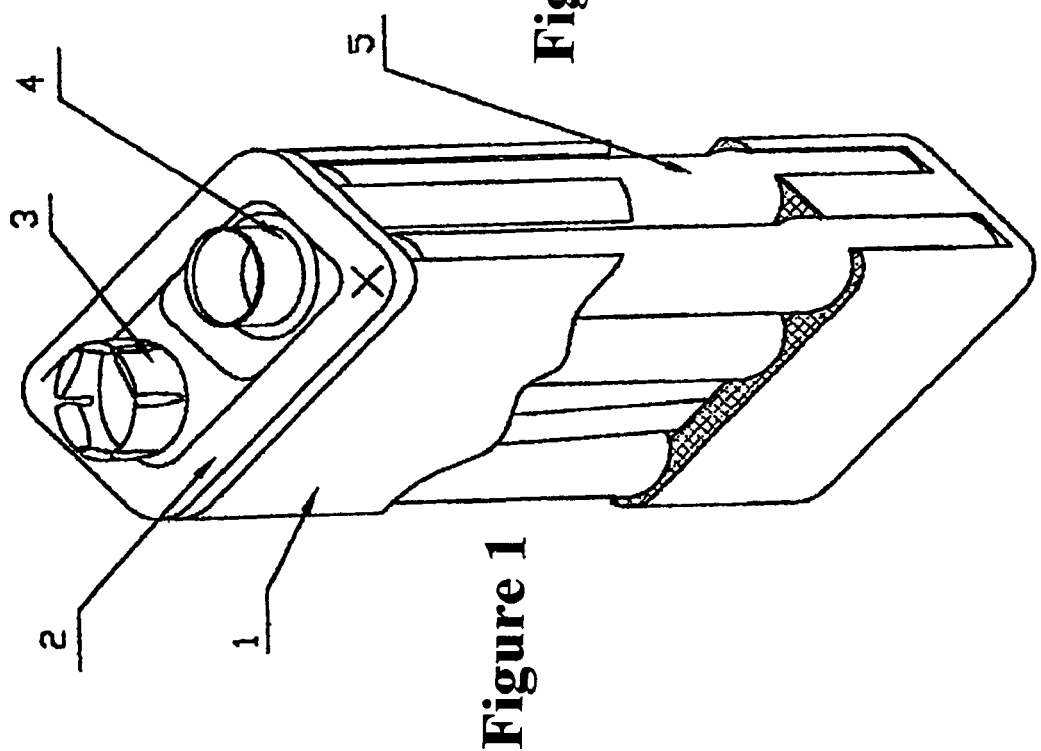
FIG. 1 is a schematic view of the structure according to the present invention.
Figure 4:
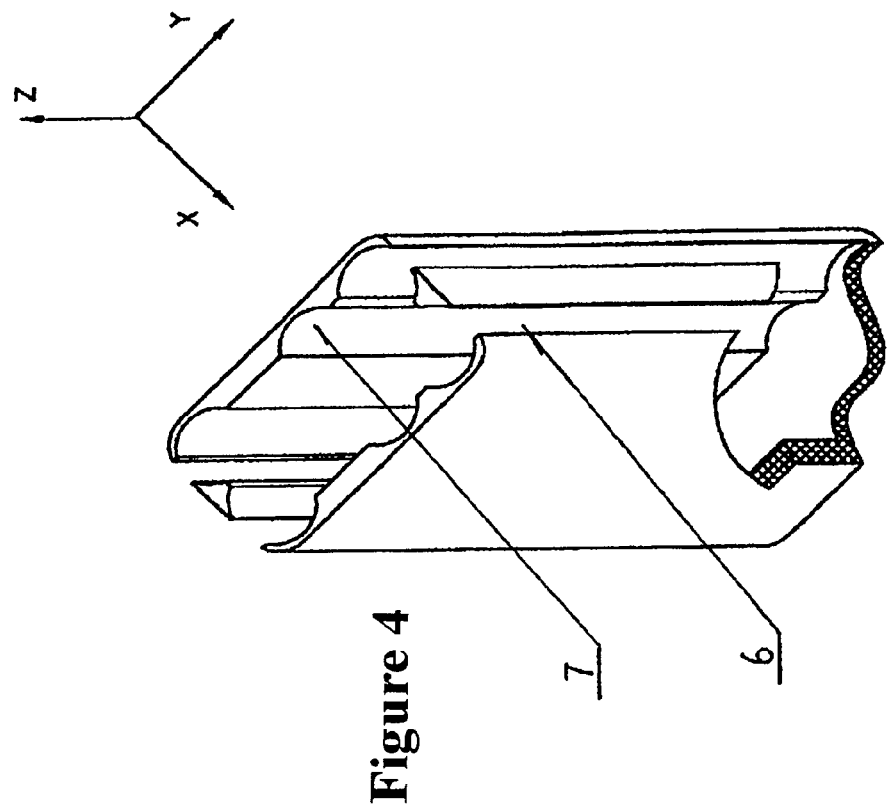
FIG. 4 is a schematic view showing a battery comprising sidewalls formed with openings according to a preferred embodiment of the present invention.

As shown in FIG. 1, FIG. 2, and FIG. 4, a rechargeable battery 5 according to the invention comprises a plurality (e.g.—6 or 7) fast-chargeable column nickel cadmium (Ni—Cd) or nickel metal hydride (Ni—MH) cells enclosed by a container 1 similar in shape and size to a conventional 9V laminated battery and a plastic cover 2 with a positive terminal 4 and a negative terminal 3. Such a battery can be charged fully within just 1.5 hours.

Figure 3:
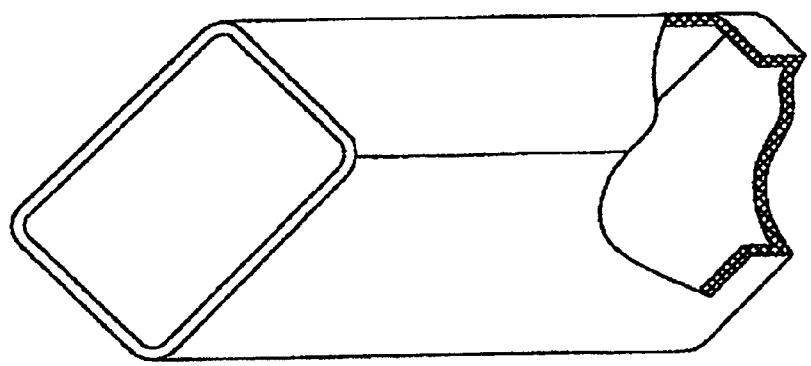
FIG. 3 is a schematic view showing a conventional 9V rechargeable battery.

Typical 9V rechargeable batteries each consist of 7 nickel cadmium (Ni—Cd) or nickel metal hydride (Ni—MH) cells and have a nominal output voltage of 8.4V, and they are most popular. As shown in FIG. 2, a rechargeable battery typically comprises 7 column cells connected in series, and thus has a ratio of the length thereof (in the X-direction) to the width (in the Y-direction) that appears greater than that of a conventional 9V laminated battery. Therefore, in order to accommodate the present cells in such a conventional 9V rechargeable battery's container as shown in FIG. 3, there are only two solutions: (1) to use column cells with a reduced diameter; or (2) to use a container with an increased length in X-direction. However, the former will result in a decreased capacity battery due to the small size of the cells, whereas the latter will make a bigger battery, which is not interchangeable with a conventional 9V laminated battery.

Therefore, as shown in FIG. 4, a container according to the present invention comprises a pair of lateral sidewalls formed with openings 6 and another pair of lateral sidewalls formed with recesses 7. The present column cells are received snugly in the container providing a high-capacity battery enclosed in a conventionally dimensioned container so as to be interchangeable with conventional 9V rechargeable batteries.

Embodiment 1:

As shown in FIG. 2, a battery comprises 7 column nickel metal hydride (Ni—MH) cells with a 6.8 mm diameter, a 41.5 mm height and a 200 mAh nominal capacity, and thus it usually outputs a 200 mAh capacity and a 8.4V nominal voltage. The battery is received in an acrylonitrile-butadiene-styrene (ABS) plastic container 1 as shown in FIG. 4. Meanwhile, a positive terminal 4 and a negative terminal 3 are extended through an ABS plastic cover that is firmly soldered to the container 1 by means of ultrasonic welding. The finished battery has an overall dimension of 15.7 mm (X-direction)×26.2 mm (Y-direction)×48.5 mm (Z-direction), and is interchangeable with a 6F22-type battery made according to the national standard of China. A battery according to the first embodiment outputs a nominal capacity of 200 mAh and a nominal voltage of 8.4V, and it can be fully charged at a maximum current of 200 mA in just 1.5 hours. Alternatively, the container may be made from other plastic materials or metallic materials; the cover 2 and the container 1 may be welded or bonded together according to the scope of the present invention.

Embodiment 2:

FIG. 3 shows a conventional plastic container for a 9V rechargeable battery according to the prior art, which has a 0.8 mm thick wall, and which is identical in size to that of Embodiment 1. Such a container can only receive 7 column cells having a diameter of 6.5 mm. The highest nominal capacity so far available by a single column nickel metal hydride (Ni—MH) cell about 6.5 mm diameter and 41.5 mm height is 160 mAh. As shown in FIG. 2, a battery comprises 7 column cells and usually outputs a capacity of 160 mAh and an 8.4V nominal voltage. The battery is received in an ABS plastic container 1 with the 0.8-mm thick wall as shown in FIG. 3. Meanwhile, a positive terminal 4 and a negative terminal 3 are extended through an ABS plastic cover that is firmly soldered to the container 1 by means of ultrasonic welding. The finished battery has an overall dimension of 15.7 mm (X-direction)×26.2 mm (Y-direction)×48.5 mm (Z-direction), and is interchangeable with a 6F22-type battery made according to the national standard of China. A battery according to the second embodiment outputs a nominal capacity of 160 mAh and a nominal voltage of 8.4V, and it can be fully charged at a maximum current of 160 mA in just 1.5 hours.

Embodiment 3:

According to FIG. 2, a battery comprises 7 column cells and usually outputs a 130 mAh capacity and an 8.4V nominal voltage. The battery is received in an ABS plastic container 1 as shown in FIG. 4. Meanwhile, a positive terminal 4 and a negative terminal 3 are extended through an ABS plastic cover that is firmly soldered to the container 1 by means of ultrasonic welding. The finished battery has an overall dimension of 15.7 mm (X-direction)×26.2 mm (Y-direction)×48.5 mm (Z-direction), and is interchangeable with a 6F22-type battery made according to the national standard of China. A battery according to the third embodiment outputs a nominal capacity of 130 mAh and a nominal voltage of 8.4V, and it can be fully charged at a maximum current of 130 mA in just 1.5 hours.

Comparative Sample 1:

A battery comprises 7 V110-type button Ni—MH cells and usually outputs a 150 mAh capacity and an 8.4V nominal voltage. The battery is received in an ABS plastic container 1 as shown in FIG. 4. Meanwhile, a positive terminal 4 and a negative terminal 3 are extended through an ABS plastic cover that is firmly soldered to the container 1 by means of ultrasonic welding. The finished battery has an overall dimension of 15.7 mm (X-direction)×26.2 mm (Y-direction)×48.5 mm (Z-direction), and is interchangeable with a 6F22-type battery made according to the national standard of China. A present battery outputs a nominal capacity of 150 mAh and a nominal voltage of 8.4V, and it can be fully charged at a maximum current of 15 mA in 15 hours.

Comparative Sample 2:

A battery comprises 7 V110-type button Cd—Ni cells and usually outputs a 110 mAh capacity and an 8.4V nominal voltage. The battery is received in an ABS plastic container 1 as shown in FIG. 4. Meanwhile, a positive terminal 4 and a negative terminal 3 are extended through an ABS plastic cover that is firmly soldered to the container 1 by means of ultrasonic welding. The finished battery has an overall dimension of 15.7 mm (X-direction)×26.2 mm (Y-direction)×48.5 mm (Z-direction), and is interchangeable with a 6F22-type battery made according to the national standard of China. A present battery outputs a nominal capacity of 110 mAh and a nominal voltage of 8.4V, and it can be fully charged at a maximum current of 11 mA in 15 hours.

What is claimed is:

1. A 9V rechargeable battery comprising a plurality of column cells connected in series and enclosed by a container (1) and a cover with a negative terminal and a positive terminal, wherein said container (1) comprises a pair of lateral sidewalls formed with openings and another pair of lateral sidewalls formed with recesses so as to receive said cells snugly.

2. A battery according to claim 1, wherein said container (1) is formed from plastic materials.

3. A battery according to claim 1, wherein the container (1) is formed from metal.

4. A battery according to claim 1, wherein it comprises 6 or 7 nickel cadmium (Ni—Cd) cells.

5. A battery according to claim 1, wherein it comprises 6 or 7 nickel metal hydride (Ni—MH) cells.

6. A battery according to claim 1, wherein it is interchangeable with a conventional laminated battery (6F22).

* * * * *